United States Patent [19]

Tsuchiya et al.

[11] Patent Number: 5,032,079
[45] Date of Patent: Jul. 16, 1991

[54] FURNACE FOR PRODUCING HIGH PURITY QUARTZ GLASS PREFORM

[75] Inventors: Ichiro Tsuchiya; Shinji Ishikawa; Masahide Saitoh; Yoichi Ishiguro; Hiroo Kanamori, all of Yokohama, Japan

[73] Assignee: Sumitomo Electric Industries, Ltd., Osaka, Japan

[21] Appl. No.: 459,299

[22] Filed: Dec. 29, 1989

[30] Foreign Application Priority Data

Dec. 29, 1988 [JP] Japan .................. 63-332005
Feb. 2, 1989 [JP] Japan .................... 1-12426

[51] Int. Cl.5 .................. C03B 37/14; C03B 20/00; F27B 11/00
[52] U.S. Cl. .................... 432/206; 65/157; 65/377.13; 65/374.15; 432/242; 432/244; 432/253
[58] Field of Search ............. 432/200, 206, 207, 208, 432/238, 242, 244, 249, 250, 253; 65/374.13, 374.15, 157

[56] References Cited

FOREIGN PATENT DOCUMENTS

| 0302121 | 2/1988 | European Pat. Off. |
|---|---|---|
| 1183430 | 7/1989 | Japan .................. 65/157 |
| 8806145 | 8/1988 | PCT Int'l Appl. .......... 65/157 |
| 332656 | 7/1930 | United Kingdom. |
| 843975 | 8/1960 | United Kingdom. |
| 2187033 | 8/1987 | United Kingdom. |

Primary Examiner—Henry A. Bennet
Assistant Examiner—Christopher B. Kilner
Attorney, Agent, or Firm—Cushman, Darby & Cushman

[57] ABSTRACT

There is provided a heating furnace comprising a furnace body, a cylindrical zone heater in the furnace body, a muffle tube installed through the furnace body for thermally treating a porous preform made of high purity quartz glass by moving the preform vertically therethrough and a partition means in the portion of the muffle tube projecting above the furnace body to divide an interior space of the muffle tube into an upper space and a lower one.

7 Claims, 9 Drawing Sheets

FURNACE FOR PRODUCING HIGH PURITY QUARTZ GLASS PREFORM

BACKGROUND OF THE INVENTION

1. Field of the Invention

The present invention relates to a furnace for producing a high purity quartz glass preform for an optical fiber. More particularly, it relates to a heating furnace for thermal treatment such as dehydration, doping or sintering of a porous glass preform consisting of fine particles of quartz glass in order to obtain a high purity quartz glass preform for fabricating the optical fiber.

2. Description of the Related Art

In a heating furnace for producing a glass preform for use in the fabrication of an optical fiber, use of a quartz glass muffle tube is described in, for example, Japanese Patent Kokoku Publication Nos. 42136/1983 and 58299/1983 and Japanese Patent Kokai Publication No. 86049/1985. However, the quartz glass tube has a serious disadvantage in that it tends to deform at a high temperature. In practice, when the heating furnace is operated at a temperature greater than 1500° C., the quartz glass tube deforms so that the furnace cannot be used again, unless a pressure difference between the outside and the inside of the muffle tube and a means for supporting the muffle tube are both accurately controlled. Further, when the furnace is used at a temperature greater than 1150° C. over an extended period of time, the quartz glass tube is devitrified or crystallized. Since the thermal coefficient of expansion of the glass layer is different from that of the devitrification layer, the muffle tube is destroyed by the strain resulting from such a difference.

The inventors have found that a carbon tube is suitable for a muffle tube and overcomes the above problems (see, for example, PCT International Publication No. WO 88/06145). The carbon tube not only has an excellent heat resistance since it is stable at a temperature greater than 2000° C., but also is easily purified to a high purity level with an ash content less than 20 ppm. In addition, it advantageously does not react with a reactive gas (for example, $Cl_2$, $CCl_4$, $SiF_4$, $SF_6$ and $CCl_2F_2$) which is useful for the thermal treatment of the glass preform for the optical fiber. The carbon tube can be fabricated precisely so that it may be made in an assembly type to reduce the production cost thereof. Further, in order to improve gas tightness of the carbon tube, it is possible to coat the outer surface thereof with a SiC layer or a further carbon layer whereby the glass preform for the optical fiber having an excellent quality can be produced.

FIG. 1 shows one example of the conventional heating furnace wherein the thermal treatment of a glass soot preform 1 is carried out with a cylindrical zone heater. A carbon heater 4 and a muffle tube 3 are provided in a furnace body 5. This heating furnace comprises an inlet 6 for introducing nitrogen gas for purging the furnace body interior, an inlet 7 for introducing an atmosphere gas to the muffle tube and a supporting rod 2 for the preform 1 which is placed inside the heating furnace. The muffle tube 3 consists of an upper member 34, a middle member 35 and a lower member 36 and at least the middle member 35 is made of carbon, on the surface of which a SiC or carbon coating may be provided.

Since the conventional heating furnace is constituted as shown in FIG. 1, an amount of air around the furnace (an atmosphere in the operation room) flows in the muffle tube when the glass preform enters or leaves the tube. FIG. 2 schematically shows an equipment which is used in measurement of an amount of the air inflow into the muffle tube. This equipment comprises a muffle tube 101, an inlet 102 for purging gas, a gas sampling tube 103, a device 104 for measuring an oxygen concentration and a pump 105, and additionally a zone heater (not shown) around the muffle tube 101. An inner diameter of the muffle tube 101 is 150 mm, and the front end of the gas sampling tube 103 is fixed at a point 1 m below from the upper edge of the muffle tube. The results are shown in FIG. 3. These results indicate that the air flows into the muffle tube, and such air inflow cannot be prevented by increase of the amount of purging nitrogen gas.

Inflow of the air will cause various problems. Firstly, the interior space of the muffle tube is contaminated by dust in the air. The dust comprise $SiO_2$, $Al_2O_3$, $Fe_2O_3$ and the like. Among them, $Al_2O_3$ will cause devitrification of the preform, and $Fe_2O_3$ will cause increase of transmission loss of the optical fiber. Secondly, the inner surface of the carbon muffle tube is oxidized. During oxidation of the sintered body of carbon, it is known that tar or pitch which is used as a binder is firstly oxidized. Therefore, the remaining graphite particles are dropped or splashed and float in the furnace. Since said particles adhere to the surface of the sintered glass preform, the optical fiber fabricated from such the glass preform has many parts with low strength. As a natural consequence, the lifetime of the carbon muffle tube is extremely shortened.

The first measure to prevent such oxidation of the muffle tube is to reduce the temperature to 400° C. or lower at which the carbon is not oxidized during the insertion and removal of a glass preform. However, at such the low temperature, the operation rate of the furnace is greatly decreased. In addition, once the muffle tube is exposed to the air, a considerable amount of oxygen and moisture in the air is adsorbed on the muffle tube since the carbon muffle tube is porous. Then, the oxidation cannot be prevented completely.

As the second measure, a method is described in PCT International Publication No. WO 88/06145. The method comprises once disposing the porous glass preform in a front chamber on the top of the muffle tube and inserting the glass preform into the muffle tube after gas replacement of the atmosphere in the front chamber with an inert gas. The muffle tube equipped with the front chamber is shown in FIG. 4.

The carbon heater 4 and the carbon made muffle tube 3 are provided in the furnace body 5 as shown in FIG. 4. The heating furnace comprises an inlet 6 for introducing a purging nitrogen to the furnace body, an inlet 7 for introducing an atmosphere gas to the muffle tube, supporting rod 2 for the glass preform, the front chamber 11, an exit 14 for exhausting the gas from the front chamber and a partition 16. The glass preform 1 is inserted into the heating furnace.

The insertion of the porous glass preform into the heating furnace shown in FIG. 4 is carried out as follows:

(1) To a rotatable and vertically movable chuck, the porous glass preform 1 is attached through the supporting rod 2.

(2) An upper cover of the front chamber 11 is opened, and the porous preform 1 is lowered into the front chamber 11.

(3) The upper cover is closed, and the interior space of the front chamber is purged with an inert gas (e.g. nitrogen or helium).

(4) The partition 16 which separates the front chamber 11 from the heating atmosphere is opened, and the porous preform 1 is introduced in the heating atmosphere which has been kept at a temperature at which the preform should be thermally treated.

(5) The partition 16 is closed.

The removal of the glass preform from the heating furnace is carried out as follows:

(1) The partition 16 is opened.

(2) The preform 1 which has been thermally treated is pulled up from the heating atmosphere to the front chamber 11. In this step, the temperature of the heating atmosphere is not necessarily lowered.

(3) The partition 16 is closed.

(4) The upper cover of the front chamber 11 is opened, and the preform is removed from the chamber 11.

Though the above furnace is superior in preventing oxidation of the muffle tube, an overall length of the heating apparatus is too long and the structure of the partition 16 is complicated. FIG. 5 shows an example of the heating apparatus for thermal treatment of a porous glass preform having an overall length of 800 mm and a seed rod length of 200 mm. In this case, the length from the lower end of the muffle tube to the lower end of the chuck is 6760 mm and the overall length of the apparatus reaches nearly 8000 mm by taking account of spaces for operation and design.

Further, since the partition 16 should be adaptable to both cases where the supporting rod is and is not through the partition, totally three members should be used, two of which are split members each having an partly cut off portion for the supporting rod, and one of which is a member to close an aperture through which the rod is passed.

Then, the procedures for operating the partition 16 is hereinafter described with reference to FIGS. 6 to 8.

FIG. 6 shows a cross-sectional view of the partition in detail when the glass preform 1 is disposed in the front chamber 11, FIG. 7 shows when the glass preform 1 is being inserted into the heating atmosphere of the muffle tube through the partition 16 after the atmosphere in the front chamber is replaced with an inert gas and the partition 16 is opened, and FIG. 8 shows when the glass preform is thermally treated.

To carry out the above three operations, three members, that is, the covering member 72 for covering an aperture and two split members 71 which are operated with two sliding rods 73 should be used.

Then, some problems arise as follows:

(1) The partition 16 consists of three members so that it takes a considerable time to close or open the partition;

(2) The structure of the partition 16 is rather complicated. In particular, it is difficult to confirm the perfect closing of the split members. Then, there is a great possibility to open the front chamber to the air with an insufficient sealing; and (3) It takes a long time to replace the interior atmosphere of the front chamber with the inert gas since the volume of the partition portion increases due to the complicated structure of the partition.

SUMMARY OF THE INVENTION

It is, therefore, an object of the present invention to overcome the abovementioned problems.

According to the present invention, there is provided a heating furnace comprising a furnace body, a cylindrical zone heater in the furnace body, a muffle tube installed through the furnace body for thermally treating a porous preform made of high purity quartz glass by moving the preform vertically therethrough and a partition means in the portion of the muffle tube projecting above the furnace body to divide an interior space of the muffle tube into an upper space and a lower one.

DETAILED DESCRIPTION OF THE DRAWINGS

The present invention will be hereinafter described with reference to the accompanying drawings.

Figure 9:
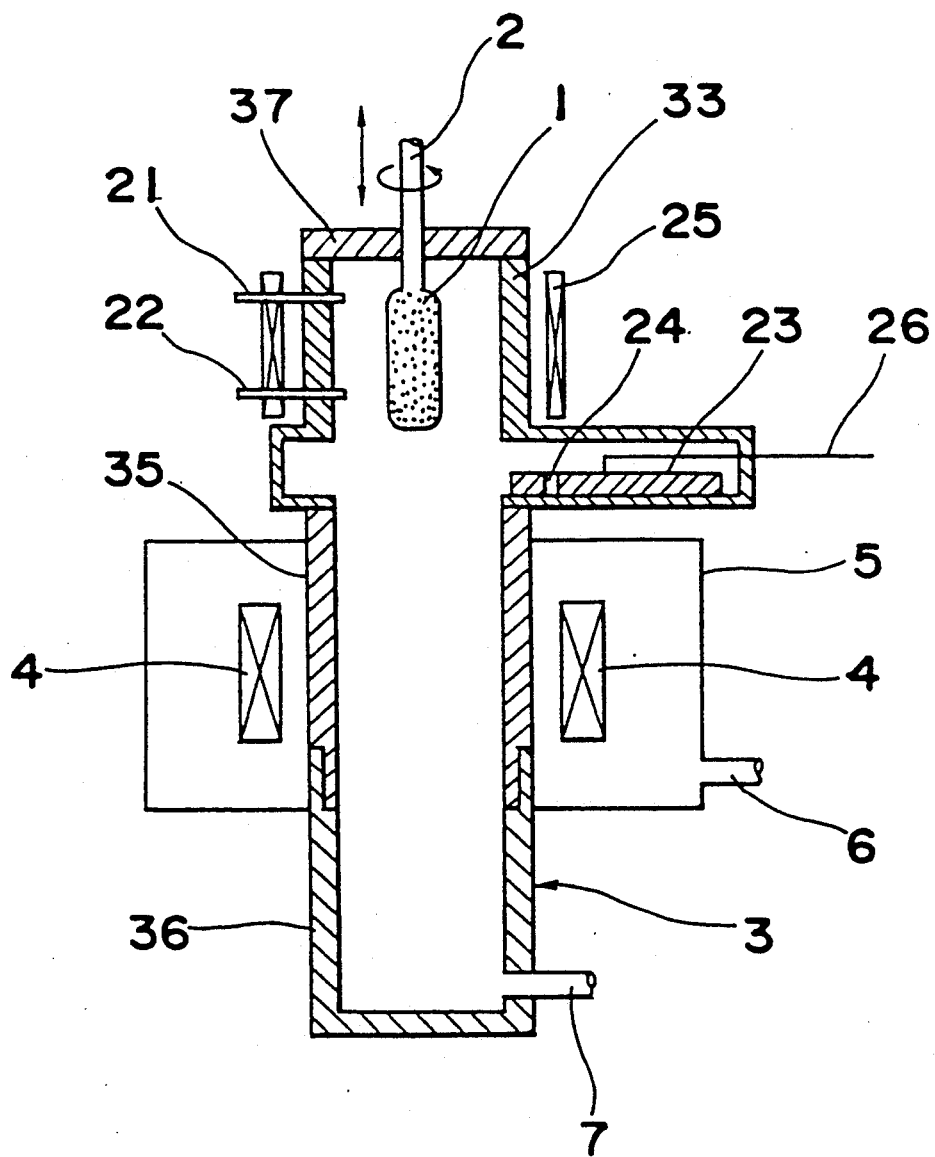

FIG. 9 shows one example of the embodiment of the heating furnace according to the present invention. The heating furnace comprises a carbon heater 4 in a furnace body 5 and a muffle tube 3 through the furnace body. The muffle tube comprises a middle member 35 and a lower member 36 each made of high purity carbon coated with SiC or carbon, and an upper member 33 and an upper cover 37 each made of quartz. The porous glass preform 1 is inserted into the heating furnace comprising an inlet 6 for introducing nitrogen as a purging gas to the furnace body, an inlet 7 for introducing an atmosphere gas to the muffle tube, a supporting rod 2 for the glass preform, an outlet 21 for exhausting the atmosphere gas from the muffle tube, an inlet 22 for introducing nitrogen gas for replacement of the upper space of the muffle tube and a partition means 23 made of quartz having a small aperture 24 for passing a gas. The partition means 23 is arranged such that it can be opened or closed by a quartz made rod 26 from the outside. When the partition means 23 is closed, the aperture 24 may be omitted if the gas can flow from the lower space of the muffle tube to the upper space of the muffle tube through any narrow gap or if any outlet for exhausting the gas is provided in the muffle tube below the partition.

Such partition means 23, that is, the partition means with no aperture, is described with reference to FIGS. 10 and 11 which show in detail the structure of the partition means 23 and FIG. 12 which shows one embodiment of the heating furnace having such the partition means.

Figure 10:
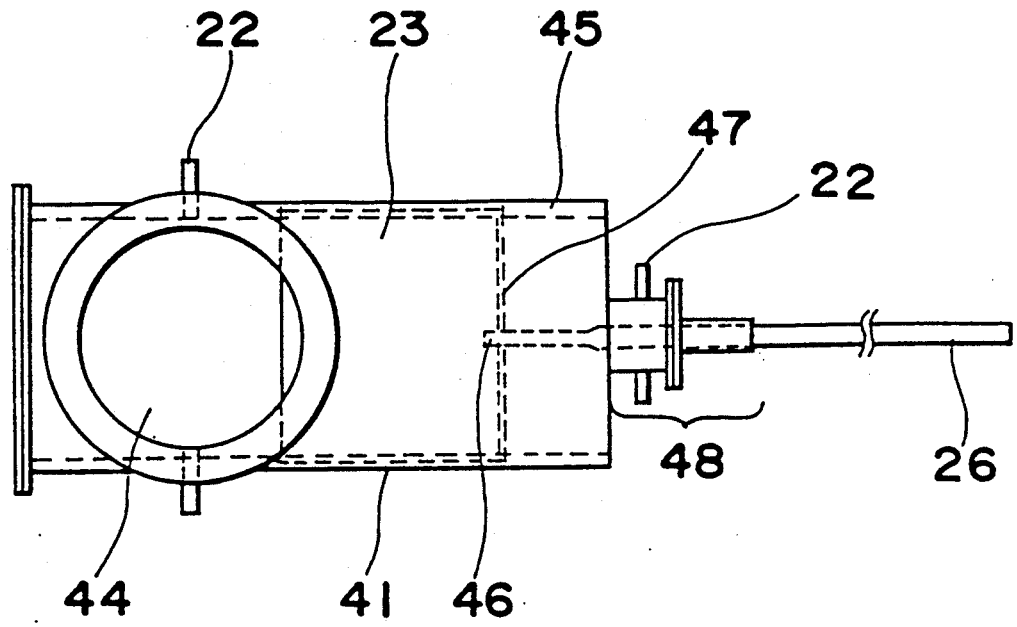
Figure 11:
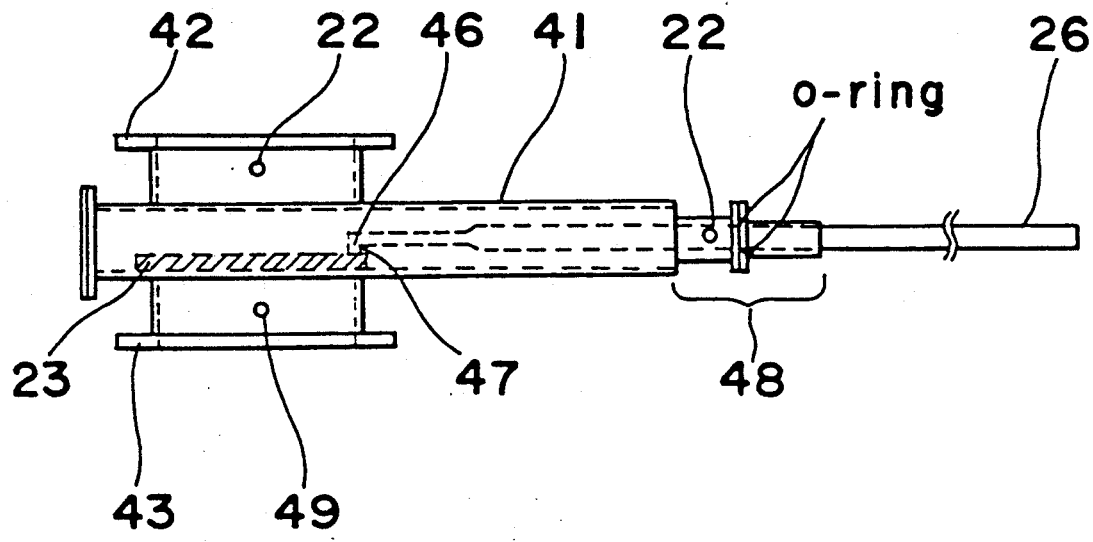
FIG. 11 shows a detailed side view of the partition means used in the heating furnace according to the present invention, FIG. 12 schematically shows a cross-sectional view of the heating furnace equipped with the partition means according to the present invention, and FIG. 13 schematically shows a heating apparatus comprising the heating furnace according to the present invention to indicate a length of the apparatus.

The partition means of in FIGS. 10 and 11 comprises a partition 23, an upper flange 42 which is connected to the upper member 33 of the muffle tube 3 and a lower flange 43 which is connected to the middle members 34 and 35 with lower member 36 of the muffle tube. Both the flanges sandwich the box member 41. When the glass preform 1 is inserted into the muffle tube through the partition means, the preform is passed through the hole 44 in the partition 23.

The partition 23 may be opened or closed by the operating rod 26 from the outside. The partition 23 is guided by the rails 45 so that it does not deviate from relation to the direction along which the partition 23 should be moved. As understood from FIG. 11, the operating rod has a step so that the diameter thereof is changed in the intermediate portion of the rod. The tip portion 46 of the operating rod has, for example, a hook member such that the tip portion can be engaged with a projection on the edge portion of the partition. Thus, when the partition 23 is closed, the operating rod 26 is inserted into the box member 41 so that the the step of the operating rod is engaged with the projection 47 (the right hand side surface of the projection in FIG. 11) and then the partition 23 is pushed. On the contrary, when the partition is opened, the tip portion 46 of the operating rod is engaged with the projection 47 (the left hand side surface of the projection in FIG. 11) so that the partition is pulled.

Figure 12:
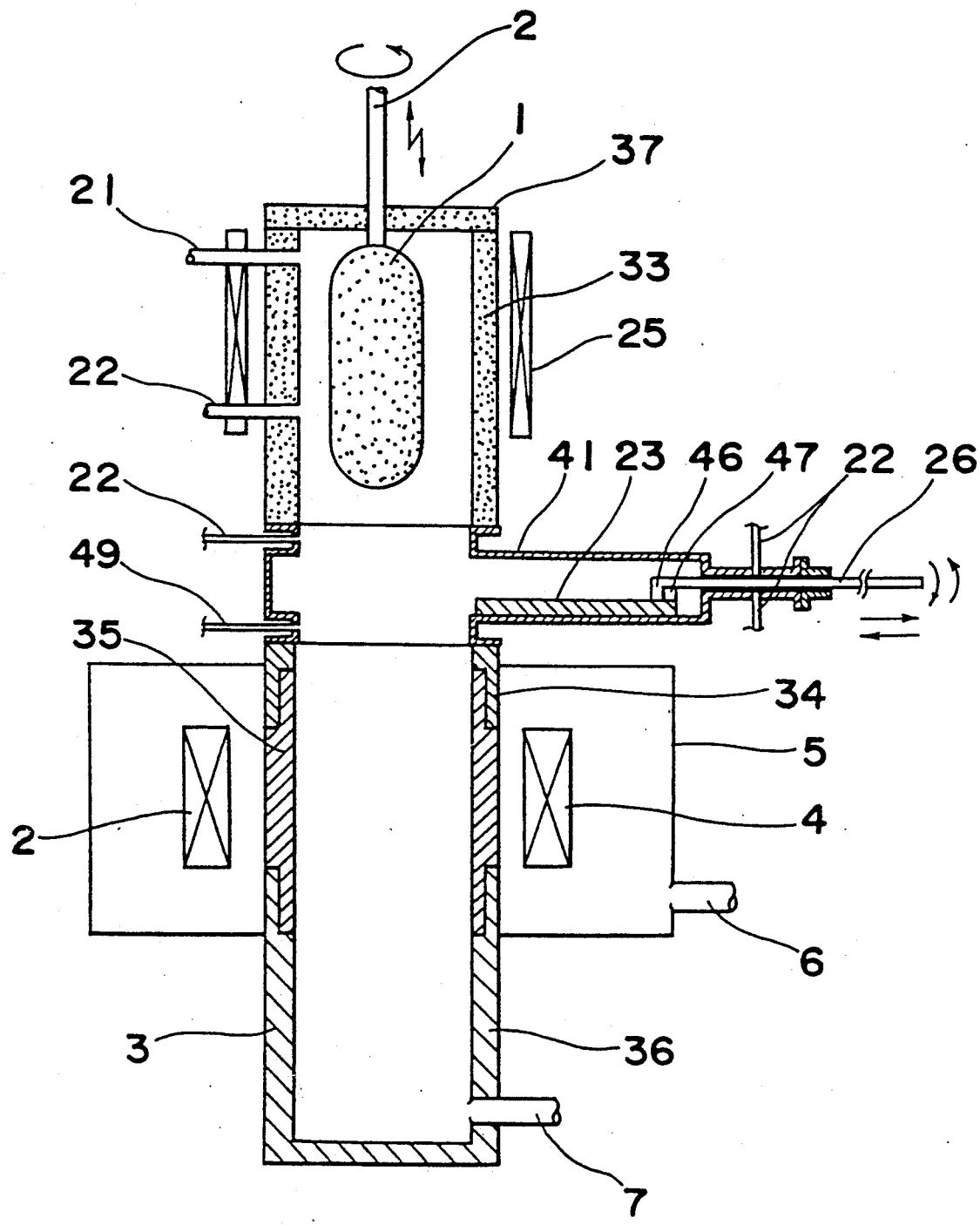

In the embodiment as shown in FIG. 12, the engagement between the projection 47 of the partition and the tip portion 46 having the hook means can be released by rotating the rod 26. Therefore, after the release, the operating rod 26 is moved back and rotated again so that the further engagement can be established between the hook means and the opposite side of the projection 47. In such the case, the step of the operating rod can be omitted.

In order to purge the interior space of the partition means, it comprises inlets 22 for introducing the inert gas on the side surface near the upper flange 42 of the partition means and in the sliding portion 48 between the box member 41 and the sliding rod 26. The sliding portion 48 is arranged such that the operating rod 26 can be slid into the box member 41 and the sliding portion may be sealed by an O-ring or may be in injection syringe structure with nitrogen purging.

In the case where the hole 44 is covered by the partition 23, the atmosphere gas is exhausted through the outlet 49 when the atmosphere gas is supplied into the middle and lower members of the muffle tube through the inlet 7 for introducing the gas. The difference between the embodiments shown in FIGS. 9 and 10 is that the purging gas in the middle and lower members of the muffle tube is exhausted to the upper member of the muffle tube 33 in the former or through the outlet 49 for exhausting the gas in the latter while the partition is closed. Others are not substantially different between these two embodiments.

A heater 25 can be provided. It can heat the glass preform 1 at 100° to 800° C. when the preform is present in the interior space of the muffle tube above the partition means 23. Such the heater may be a resistance heater or an infrared heating lamp. The glass preform 1 should be completely accommodated within the upper space of the muffle tube. The position where the partition means is located between the upper and lower spaces is not critical and also is not limited to the embodiment shown in FIG. 12 Generally, the partition means is located in the upper space above the furnace body.

When the porous glass preform is inserted into the muffle tube of the heating furnace as shown in FIG. 12, the partition means is operated as follows:

(1) The porous glass preform 1 is fixed to the chuck through the supporting rod 2.

(2) After the upper cover 37 of the muffle tube 3 is opened, the preform is inserted in the upper member 33 of the muffle tube. In this insertion step, the partition 23 is closed and the purging nitrogen gas is supplied to the lower muffle tube 3 from the inlet 7 and is exhausted through the outlet 49 to the outside. Therefore, the middle and lower members 34, 35 and 36 of the muffle tube is in nitrogen atmosphere and, even when the upper cover 37 is opened, the air may not flow in the middle and lower members of the muffle tube. In the embodiment as shown in FIG. 9, the atmosphere gas is exhausted through the aperture 24 into the upper member 33 of the muffle tube.

(3) The upper cover 37 is closed and nitrogen gas is supplied through the inlets 22 disposed in the upper portion of the muffle tube, the upper portion of the partition means and the sliding portion for replacement of the interior atmosphere of the upper portion of the muffle tube with nitrogen. During such the replacement, it is preferred to heat the preform 1 by the heater 25 so that any gas which has been adsorbed on the porous glass preform is advantageously released.

(4) The partition 23 is opened and the glass preform is lowered to the position where the thermal treatment is initiated, for example, a position where the lower end of the porous glass preform meet the upper end of the heater 4. The nitrogen supply through the inlets 22 for introducing the purging gas is stopped, the heater 25 is turned off, and the thermal treatment of the porous preform is started.

The preform is removed from the heating furnace as follows:

(1) After finishing the thermal treatment, the preform is drawn up to the level above the partition 23. Nitrogen gas is introduced through the inlet 7 and exhausted through the outlets 21 and 49 to perfectly replace the interior atmosphere of the muffle tube with nitrogen and to form the nitrogen atmosphere in the muffle tube.

(2) The partition 23 is closed. In this step, the amount of nitrogen gas may be reduced. However, nitrogen gas should be continuously supplied such that any gas outside the muffle tube is not involved through the outlet 49 into the inside of the middle and the lower members of the muffle tube.

(3) The upper cover 37 is opened and the preform 1 is removed from the muffle tube.

The present invention will be hereinafter explained by the following examples.

EXAMPLE 1

Figure 5:
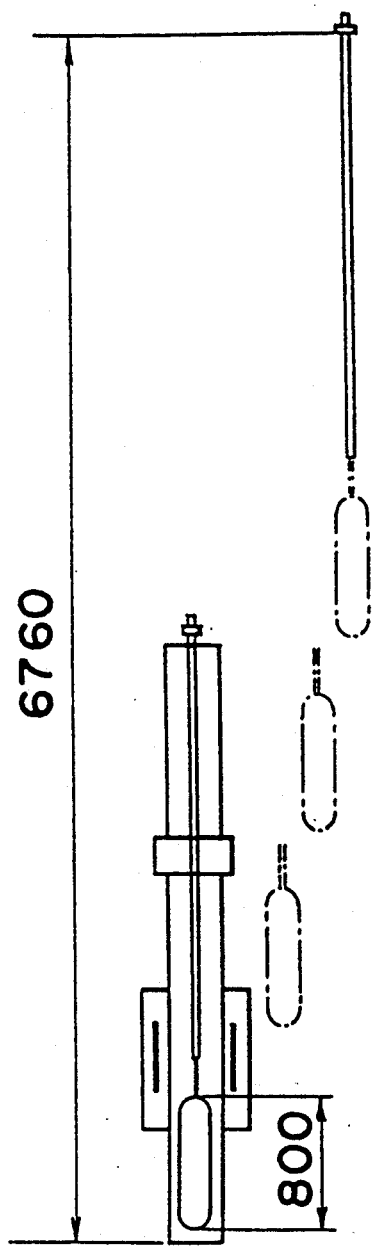
Figure 13:
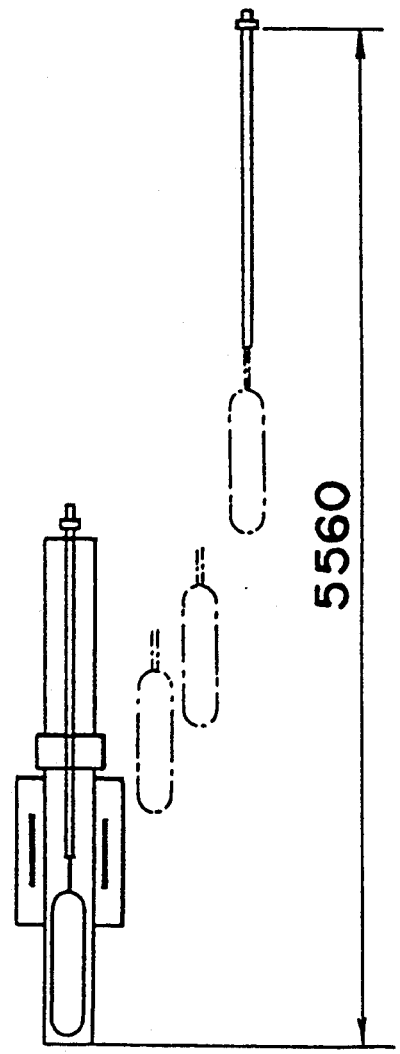
Figure 6:
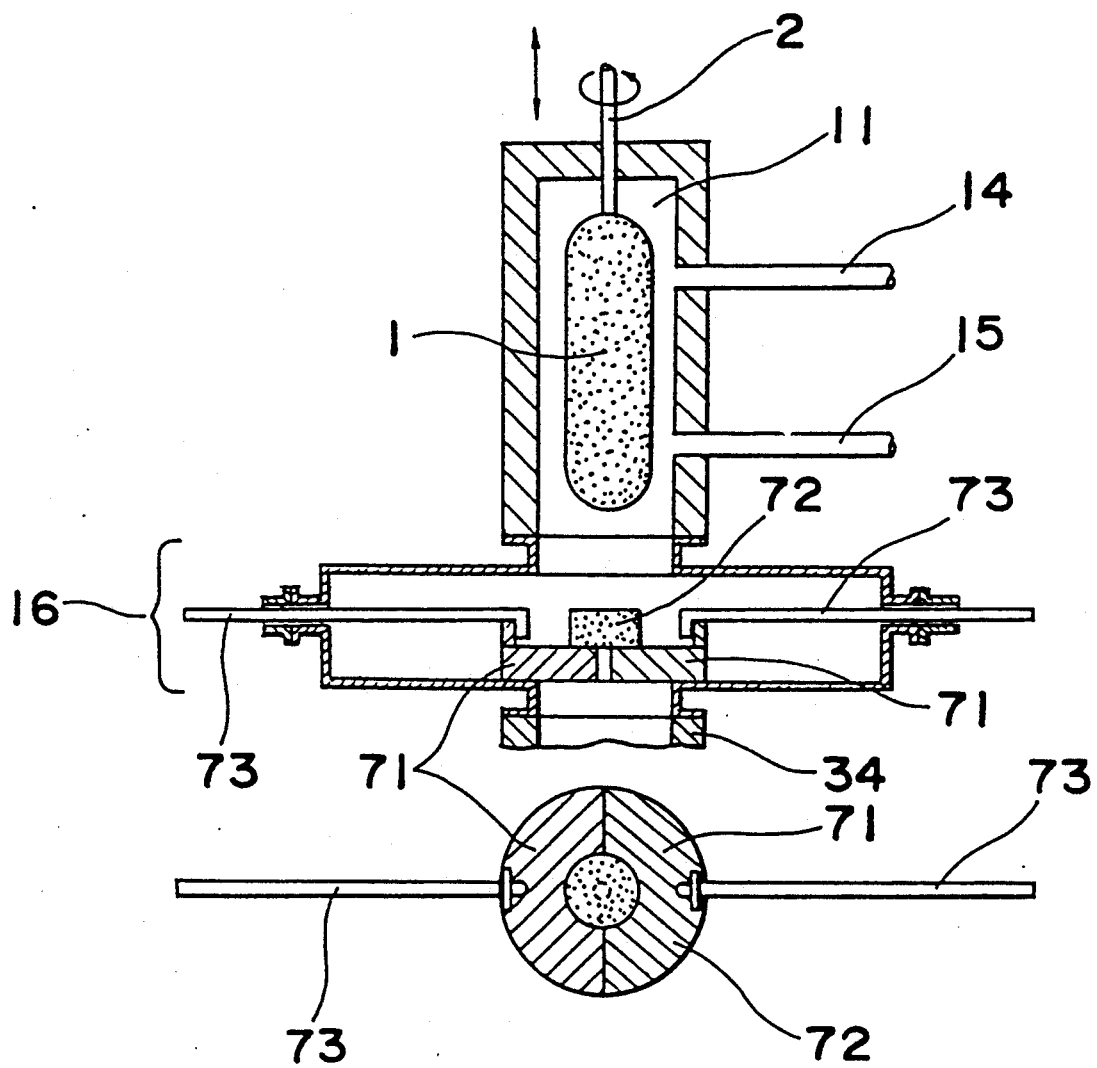
Figure 7:
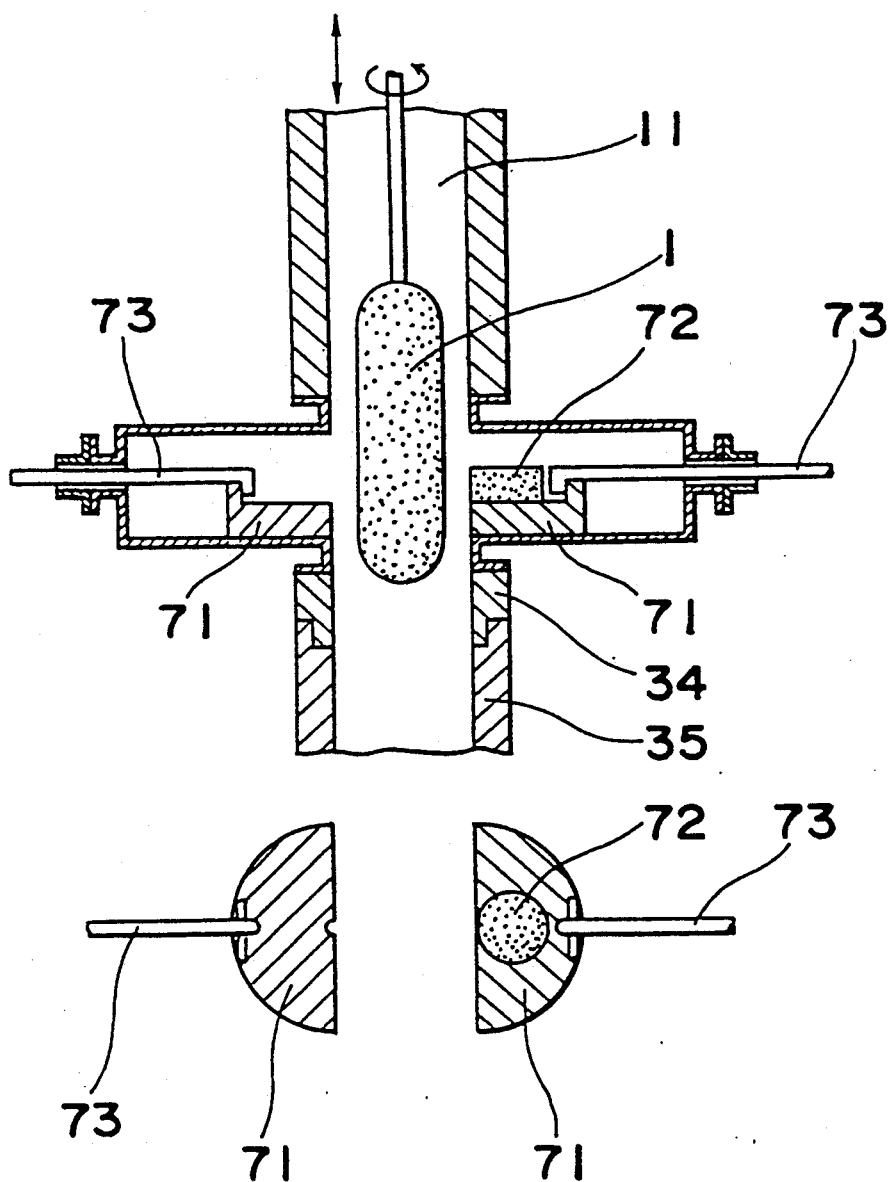
Figure 8:
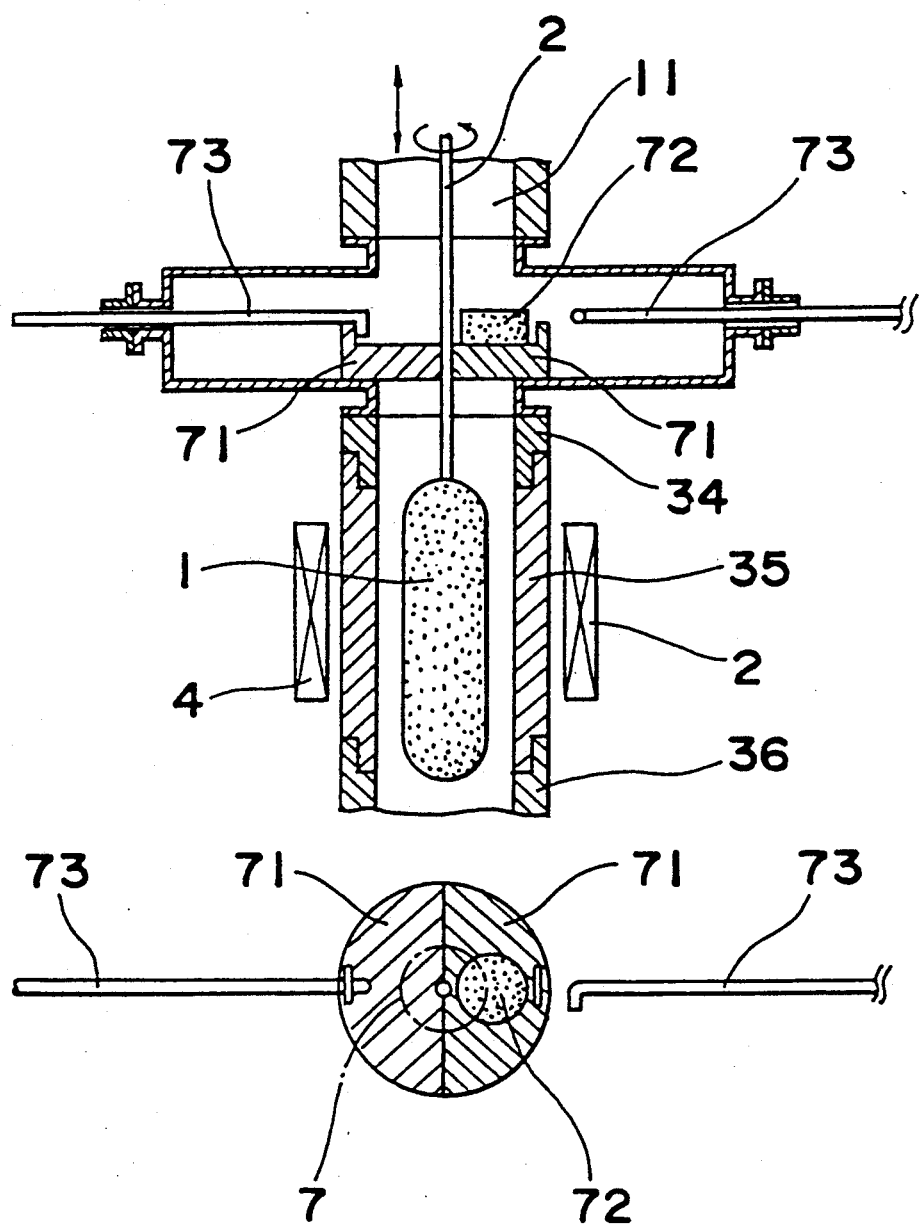

The heating apparatus comprising the heating furnace according to the present invention as shown in FIG. 9 was designed, in which a porous glass preform having the total length of 800 mm and the seed rod having the length of 200 mm can be suitably treated. The required minimum length for the heating apparatus from the lower end of the muffle tube to the lower end of the chuck was 5560 mm as shown in FIG. 13. The total length of the heating apparatus containing the length necessary for design and the length necessary for operation was 6800 mm, which was shorter by about 1.2 m than that of the apparatus as shown in FIG. 5 in which the same glass preform can be treated.

EXAMPLE 2

The heating furnace as shown in FIG. 9 was used.

The porous glass material was disposed in the upper member 33 of the muffle tube and the upper cover 37 was closed. Nitrogen gas was introduced into the upper member at the flow rate of 10 l/min. for ten minutes and also nitrogen gas was supplied into the lower and the middle members of the muffle tube at the flow rate of 10 l/min. for ten minutes. During this procedure, the partition 23 was closed. The muffle tube comprised the middle and the lower members 34, 35 and 36 made of high purity carbon, outer surfaces of which were coated with a gas impermeable carbon layer or a SiC layer.

The partition 23 was opened and the glass preform was inserted in the middle and the lower members of the muffle tube and thermally treated to obtain the preform for the production of the optical fiber. The conditions of the dehydration and the sintering operations were as follows:

Dehydration operation:
  He supply rate: 10 l/min.
  $Cl_2$ supply rate: 500 cc/min.
  Preform traverse rate: 8 mm/min.
  Temperature: 1100° C.
Sintering operation:
  He supply rate: 10 l/min.
  Preform traverse rate: 3 mm/min.
  Temperature: 1650° C.

A glass preform for the optical fiber was produced by using the obtained preform as a core material and a fluorine-doped glass pipe which was separately produced as a cladding and integrating them in a resistance heating furnace. Such the preform of which outside surface was coated with an additional glass layer to adjust the diameter thereof was drawn to produce a pure silica-core single mode optical fiber. The transmission loss of the optical fiber at the light wavelength of 1.55 $\mu$m was found to be as low as 0.18 dB/km.

EXAMPLE 3

The thermal treatment of the porous glass preform as in Example 2 was repeated forty times. An amount of lost carbon during the series of the treatments was 14 g, which amount corresponded to exhaustion of carbon layer of 35 $\mu$m in thickness due to oxidation in the heated portion. Such the amount indicates that the carbon made muffle tube can be used for about two years.

COMPARATIVE EXAMPLE 1

Figure 1:
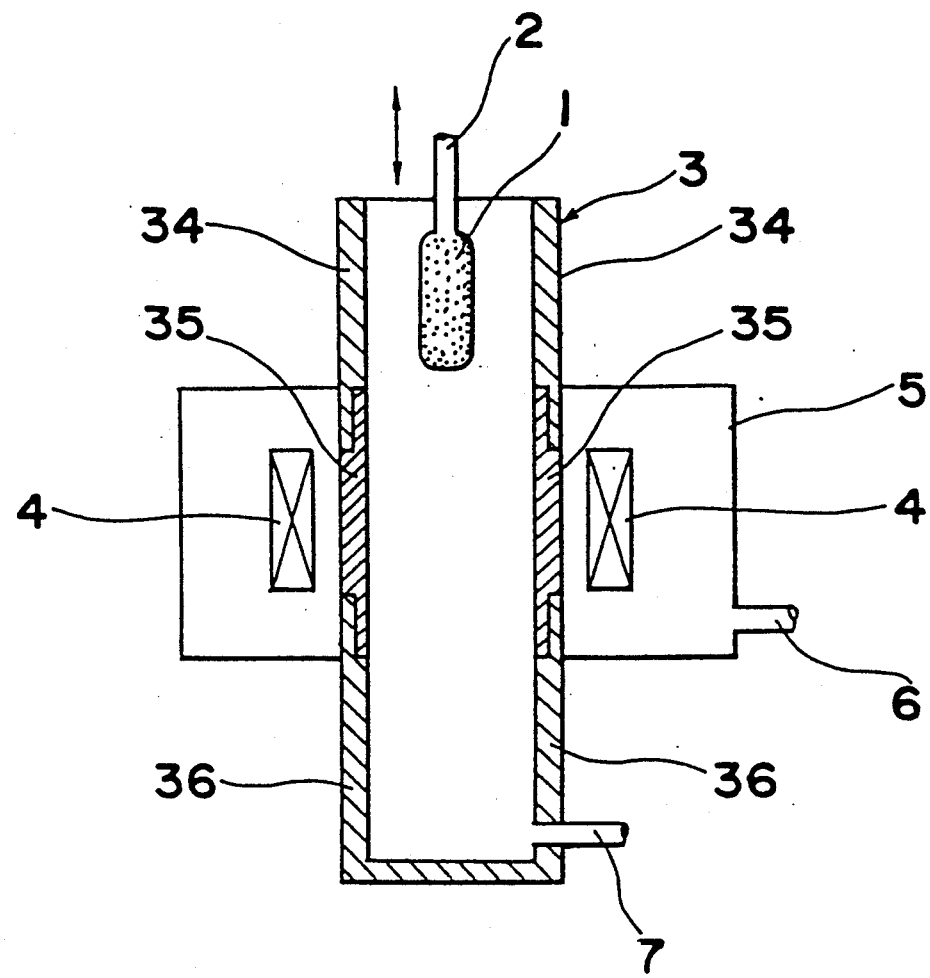
FIG. 1 schematically shows a cross-sectional view of a conventional heating furnace, FIG. 2 schematically shows an apparatus for measurement of an amount of air inflow into a muffle tube.
Figure 2:
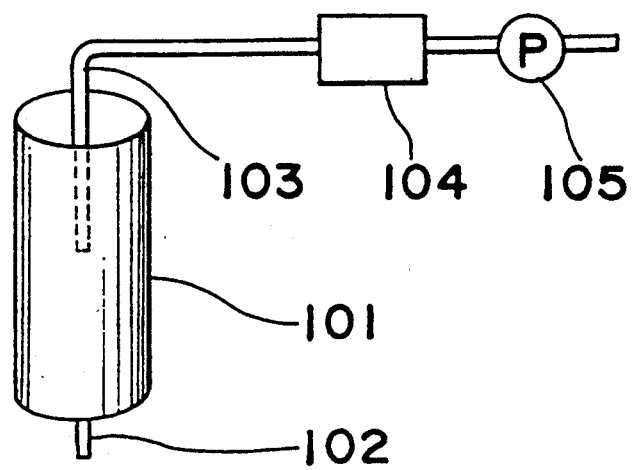
Figure 3:
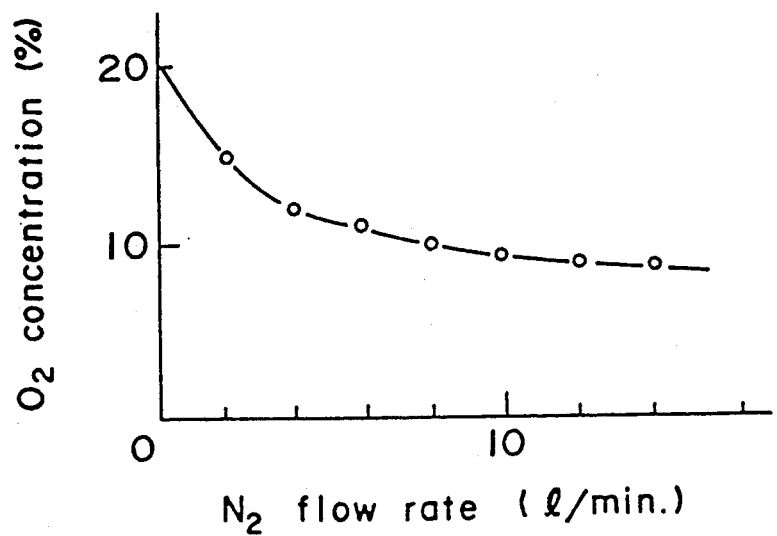
FIG. 3 shows results of the air inflow measurement with the apparatus shown in FIG. 2, FIG. 4 schematically shows a cross-sectional view of another conventional heating furnace, FIG. 5 schematically shows a heating apparatus to indicate a length of the apparatus comprising the heating furnace as shown in FIG. 4, FIGS. 6 to 8 schematically show detailed cross-sectional views of the partition conventionally used in the conventional heating furnace as shown in FIG. 4, FIG. 9 schematically shows a cross-sectional view of one embodiment of the heating furnace according to the present invention, FIG. 10 schematically shows a detailed plane view of the partition means which is used in the heating furnace according to the present invention.
Figure 4:
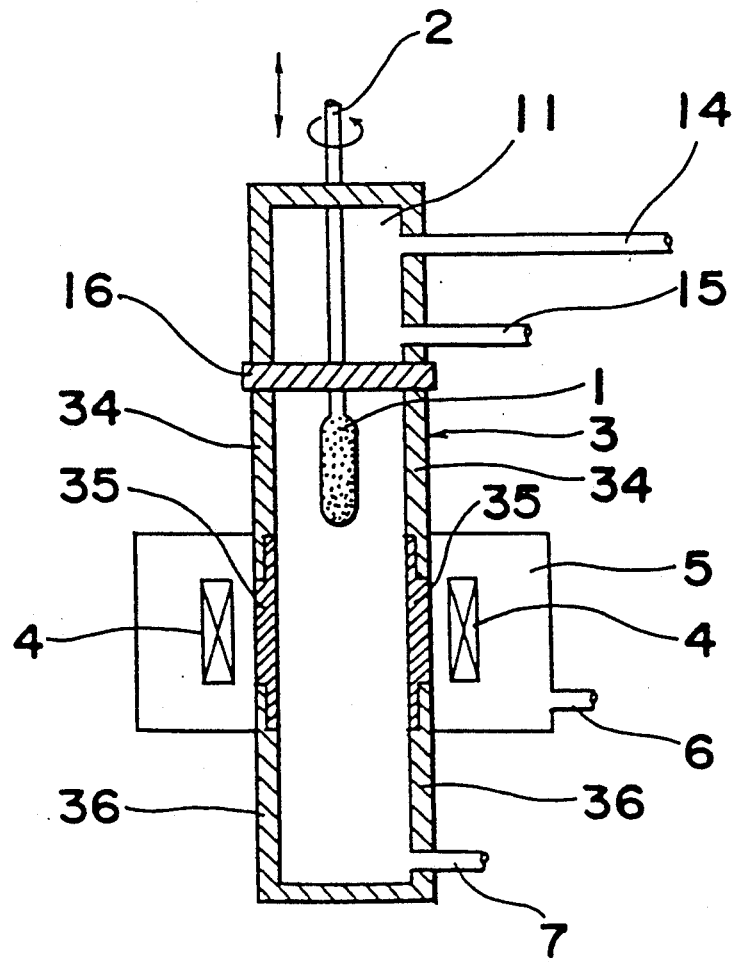

A heating furnace of the prior art as shown in FIG. 4 was used.

The porous glass preform was disposed in the front chamber 11 and the upper cover of the chamber was closed. Nitrogen gas was introduced into the front chamber at the flow rate of 10 l/min. for ten minutes to replace the interior atmosphere of the front chamber. During this step, the partition 16 was closed. Then, the partition was opened, the porous glass preform was lowered into the muffle tube 3 and then thermally treated after closing the partition to produce a transparent glass preform for the optical fiber.

When the preform was removed from the heating furnace, firstly the partition 23 was opened and then it was closed after the preform was moved into the front chamber. Finally, the upper cover was opened.

An optical fiber was produced by using the obtained preform as the core in the same manner as in Example 1. The transmission loss of the optical fiber at the light wavelength of 1.55 $\mu$m was measured to be as low as 0.18 dB/km.

COMPARATIVE EXAMPLE 2

The thermal treatment of the porous glass preform as in Comparative Example 1 was repeated forty times. An amount of lost carbon during the series of the treatments was 20 g, which amount corresponds to exhaustion of carbon layer of 50 $\mu$m in thickness due to oxidation in the heated portion. Such the amount indicates that the carbon made muffle tube can be used for about one year and a half.

The difference in the exhausted amount of carbon made muffle tube between Example 3 and Comparative Example 2 was due to effects resulted from the following points:
(1) Nitrogen was further supplied to the lower and the middle members of the muffle tube in Example 3;
(2) The structure of the partition means was more complicated in Comparative Example 1 so that the volume to be replaced with nitrogen gas was larger; and
(3) During the replacement with nitrogen gas, the position at which the porous glass preform was located was nearer to the heater in Example 3, so that gas desorption from the porous glass preform was promoted.

EXAMPLE 4

Example 2 was repeated except that period for the nitrogen replacement was increased to twenty minutes and the glass preform was heated by an infrared lamp of 800 W during the replacement. Further, in order to heat the preform uniformly, it was rotated during the replacement. The exhausted amount of carbon of the muffle tube was 6 g, which corresponded to exhaustion of carbon layer of 5 $\mu$m in thickness from the surface. Such the amount indicates that the carbon made muffle tube can be used for about five years.

EFFECTS OF THE INVENTION

The effects of the present invention are as follows:

The inflow of the atmosphere around the heating furnace can be prevented, whereby the contamination of the heating atmosphere in the muffle tube due to the impurities in the air may be prevented. Then, the devitrification of the glass preform can be prevented and also the transparency of the preform can be improved.

In the case where the muffle tube is made of carbon, the life of the muffle tube may be extended since the carbon loss due to oxidization is suppressed. In comparison with the heating furnace of the prior art which has the front chamber for the same purpose as in the present invention, the similar or the improved effects as described above may be provided by the heating furnace according to the present invention in spite of the simplicity in the structure and the mechanism of the muffle tube. Further, the total length of the heating apparatus can be shorter.

Further, an operating efficiency of the heating furnace is improved since the glass preform can be inserted to and removed from the muffle tube without reducing the temperature of the muffle tube.

What is claimed is:

1. A heating furnace comprising a furnace body, a cylindrical zone heater in said furnace body, a muffle tube installed through said furnace body for thermally treating a porous preform made of high purity quartz glass by moving the preform vertically therethrough and a partition means in the portion of the muffle tube projecting above the furnace body to divide an interior space of the muffle tube into an upper space and a lower one, wherein the upper space formed by partitioning with the partition means has a volume which is large enough to accommodate the glass preform and a distance between an upper end of said heater and the partition means is less than a length of the porous preform.

2. The heating furnace according to claim 1, wherein a lower portion of the muffle tube located below the partition means is made of high purity carbon.

3. The heating furnace according to claim 1, wherein an upper portion of the muffle tube located above the partition means is made of quartz glass.

4. The heating furnace according to claim 1, wherein a heating means is provided around an upper portion of the muffle tube located above the partition means.

5. The heating furnace according to claim 1, wherein the partition means comprises a hole through which the glass preform passes, a covering member which covers and seals the hole, an operating rod which moves the covering member to close the partition means and an accommodating member which accommodates the hole, the covering member and the operating rod, the operating rod being arranged such that it slides into the accommodating member to move the covering member, the accommodating member being gas-tightly connected to an upper portion which forms the upper space of the muffle tube and a lower portion which forms the lower space of the muffle tube.

6. The heating furnace according to claim 1, wherein the partition means is made of quartz glass.

7. A heating furnace comprising a furnace body, a cylindrical zone heater in said furnace body, a muffle tube installed through said furnace body for thermally treating a porous preform made of high purity quartz glass by moving the preform vertically therethrough and a partition means in the portion of the muffle tube projecting above the furnace body to divide an interior space of the muffle tube into an upper space and a lower one, wherein the partition means comprises a hole through which the glass preform passes, a covering member which covers and seals the hole, an operating rod which moves the covering member to close the partition means and an accommodating member which accommodates the hole, the covering member and the operating rod, the operating rod being arranged such that it slides into the accommodating member to move the covering member, the accommodating member being gas-tightly connected to an upper portion which forms the upper space of the muffle tube and a lower portion which forms the lower space of the muffle tube.

* * * * *